United States Patent [19]

Itoh et al.

[11] Patent Number: 4,559,564
[45] Date of Patent: Dec. 17, 1985

[54] TWO-DIMENSIONAL IMAGE READER

[75] Inventors: Masataka Itoh, Tenri; Shohichi Katoh, Yamatokoriyama, both of Japan

[73] Assignee: Sharp Kabushiki Kaisha, Osaka, Japan

[21] Appl. No.: 581,131

[22] Filed: Feb. 17, 1984

[30] Foreign Application Priority Data

Feb. 21, 1983 [JP] Japan .................................. 58-28072
May 25, 1983 [JP] Japan .................................. 58-93651

[51] Int. Cl.⁴ ............................................. H04N 1/02
[52] U.S. Cl. .................................. 358/293; 358/294; 358/213; 250/578
[58] Field of Search ............... 358/293, 294, 285, 213; 250/578, 28, 324, 325, 326; 355/3 CH

[56] References Cited

U.S. PATENT DOCUMENTS 3,220,324 11/1965 Smelling ........................ 355/3 CH
3,867,027 2/1975 Weigl ............................. 355/3 CH
4,319,284 3/1982 Kiess et al. ..................... 358/294
4,419,696 12/1983 Hamano et al. ................. 358/294
4,485,410 11/1984 Fujimawa et al. ............... 358/294

Primary Examiner—Edward L. Coles, Sr.
Attorney, Agent, or Firm—Birch, Stewart, Kolasch & Birch

[57] ABSTRACT

A two-dimensional image sensor includes a two-dimensional photoconductive layer. A flat common electrode is formed on one major surface of the two-dimensional photoconductive layer. A pin electrode array having a plurality of pin electrodes aligned in a first direction is disposed above a second major surface of the two-dimensional photoconductive layer. An optical fiber lens array is fixed to the pin electrode array in order to apply optical image onto the second major surface of the two-dimensional photoconductive layer at a same time when a high voltage is applied by the pin electrodes. A shift means is connected to the pin electrode array to shift the pin electrode array and the optical fiber lens array in a second direction which is perpendicular to the first direction. Electric current is obtained at the flat common electrode, which represents the optical image applied by the optical fiber lens array.

14 Claims, 4 Drawing Figures

TWO-DIMENSIONAL IMAGE READER

BACKGROUND OF THE INVENTION

The present invention relates to an image sensor and, more particularly, to a two-dimensional image reading system which includes a sensor member disposed over two dimensions.

The MOS image sensor, CCD image sensor, contact type image sensor, etc. have been developed for an image reading device in, for example, a facsimile machine. The MOS image sensor has an array of light responsive elements and an array of MOS transistors for scanning the output signals developed from the light responsive elements. The CCD image sensor transfers the charge representing the image information via the CCDs.

Both of the MOS image sensor and the CCD image sensor are formed on a monocrystal semiconductor substrate through the use of the IC technique. Thus, a large size sensor is difficult to form. Accordingly, the MOS image sensor and the CCD image sensor are generally combined with an optical lens system so as to form de-magnified image on the image sensor.

The optical lens system requires a predetermined optical path which prevents the reduction of the size of the image reading apparatus.

To solve the optical path problem, the contact type image sensor has been proposed, which includes a light responsive member having a size greater than or equal to the original document size. The image of the same size as the original document is formed on the light responsive memeber via an optical fiber. The contact type image sensor needs the light responsive member having the same size as the original documnet and, therefore, a uniform photoconductive layer of a considerably large size must be formed.

One type of the contact type image sensor now proposed is a one-dimensional image sensor employing a CdS photoconductive layer which is isolated to form light responsive elements aligned in a line. However, this type of the image sensor has a complicated construction which complicates the manufacturing process therefor. Furthermore, the reading speed is limited by the response speed of the photoconductive layer. If such a one-dimensional CdS image sensor is used to read two-dimensional image information, the reading speed is considerably slow because the one-dimensional sensor must be repeatedly used to read the two-dimensional information.

Moreover, it is difficult to integrally combine the CdS sensor section with switching elements through the use of the IC technique. This will increase the cost of the driver circuit.

Another type of the contact type image sensor now proposed is a one-dimensional sensor employing a continuous strip shaped photoconductor made of, for example, amorphous silicon. However, these one-dimensional image sensor are not suited for reading the two-dimensional information because the one-dimensional image sensor must be repeatedly used to scan the entire surface of the two-dimensional document. This slows down the reading speed.

OBJECTS AND SUMMARY OF THE INVENTION

Accordingly, an object of the present invention is to provide an image sensor suited for reading the two-dimensional information.

Another object of the present invention is to provide a two-dimensional image reading system which ensures accurate and high speed reading of the two-dimensional image information.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a two-dimensional photoconductive layer is provided, which has a size greater than or equal to the document size. Electric charges and optical image are applied to one surface of the two-dimensional photoconductive layer while the charging device and the optical system are relatively moved in one direction with respect to the two-dimensional photoconductive layer. A detection electrode is formed on the opposite surface of the two-dimensional photoconductive layer in order to detect electric current representative of the optical image applied to the surface of the two-dimensional photoconductive layer.

In a preferred form, the charging device is a corona charger having a corona wire extending in the first dimension. The corona charger has an exposure slit extending in the first dimension through which the optical image is applied to the surface of the two-dimensional photoconductive layer. The corona charger is driven to travel in the second dimention so that the optical image application is conducted immediately after the charging operation conducted by the corona wire. The detection electrode includes a plurality of strip shaped line electrodes each of which extends in the second dimension. By scanning the line electrodes, an electric signal is obtained, which represents the optical image applied to the surface of the two-dimensional photoconductive layer.

In another preferred form, the charging device includes an array of pin electrodes aligned in the first dimension. The optical system includes an array of optical fibers aligned in the first dimension for applying the optical image to the surface of the two-dimensional photoconductive layer. The pin electrode array and the optical fiber array are disposed in a housing which is driven to travel in the second dimension so that the electric charge is applied to the surface of the two-dimensional photoconductive layer immediately after the application of the optical image. A scanning circuit is associated with the pin electrode array in order to sequentially apply the voltage to the pin electrodes. The detection electrode includes a flat common electrode attached to the opposite surface of the two-dimensional photoconductive layer. The electric current flows through the flat common electrode, which represents the brightness of the point corresponding to the pin electrode to which the voltage is now applied.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
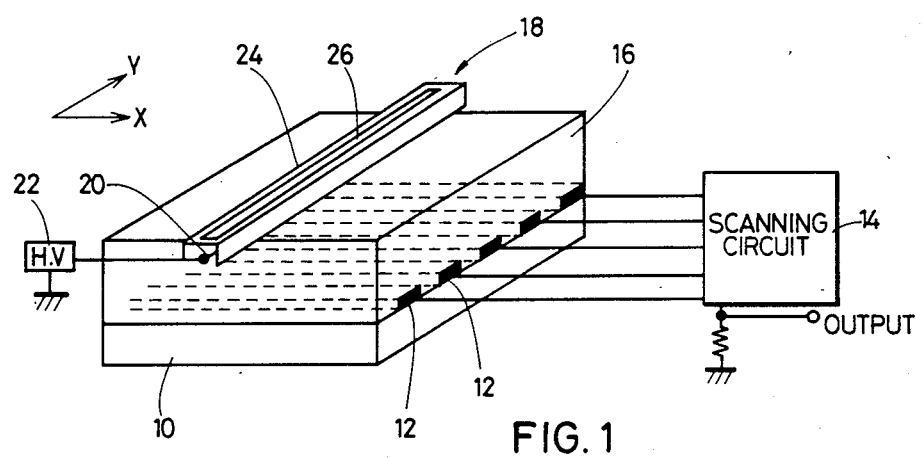
FIG. 1 is a perspective view of an embodiment of a two-dimensional image sensor of the present invention.

A two-dimensional image sensor of the present invention includes a glass substrate 10 which has a size greater than or equal to the size of a two-dimensional original to be read. Stripe shaped X-electrodes 12 are formed on the glass substrate 10 by depositing aluminum with a predetermined pitch through the use of the evaporation technique. The width and the pitch of the X-electrodes 12 affect the resolution. A scanning circuit 14 is connected to the X-electrodes 12 for sequentially applying a voltage signal, thereby performing the reading operation. A photoconductive layer 16 is formed on the glass substrate 10 so as to cover the X-electrodes 12. The photoconductive layer 16 substantially covers the entire surface of the glass substrate 10, and has a uniform thickness. In a preferred form, the photoconductive layer 16 includes CdS photoconductor powder mixed with and dispersed in resin. The CdS photoconductive layer 16 must have a resistance value greater than $10^8 \Omega$ cm so as to ensure stable charging on the photoconductive layer 16. The thickness of the photoconductive layer 16 is determined so as not to cause the breakdown (the charge voltage at the dark portion is 500 V through 600 V), and preferably 20 $\mu$m through 50 $\mu$m. The photoconductive layer used in a copying machine satisfies these requirements.

A corona charger unit 18 is disposed above the photoconductive layer 16 in a manner that the corona charger unit 18 is slidable in the X-direction along the surface of the photoconductive layer 16. The corona charger unit 18 includes a corona wire 20 extending in the Y-direction, to which a high voltage circuit 22 is connected in order to apply charges on the surface of the photoconductive layer 16. A shielding case 24 of the corona charger unit 18 is provided with a slit opening 26 extending in the Y-direction. The slit opening 26 is associated with an optical exposure system so as to apply an optical image onto the surface of the photoconductive layer 16.

Figure 2:
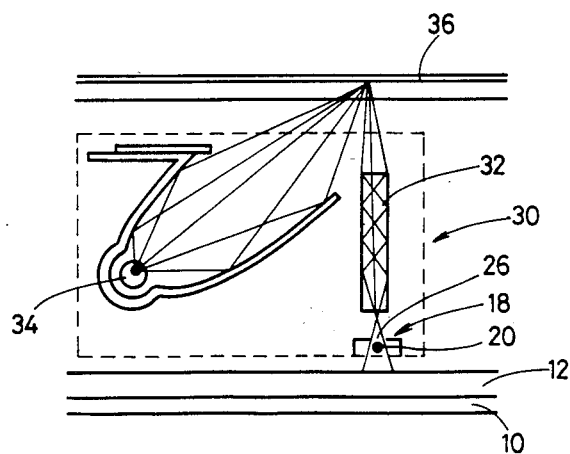
FIG. 2 is a schematic front view of an image reading apparatus employing the two-dimensional image sensor of FIG. 1.

FIG. 2 schematically shows an image reading apparatus employing the two-dimensional image sensor of FIG. 1. Like elements corresponding to those of FIG. 1 are indicated by like numerals.

An optical exposure system 30 is associated with the slit opening 26 formed in the corona charger unit 18. The optical exposure system 30 includes an array of fiber optic lenses 32 which confronts the slit opening 26. A light source 34 is included in the optical exposure system 30 for applying the optical image reflected from an original document 36 to the fiber optic lens array 32. The corona charger unit 18 is incorporated in the optical exposure system 30, and the optical exposure system 30 is driven to travel in the X-direction for scanning the two-dimensional original document 36.

That is, the two-dimensional original document 36 is read out by shifting the optical exposure system 30 and the corona charger unit 18 in the X-direction, and by scanning the X-electrodes 12. The scanning speed of the X-electrodes 12 must be higher than M times the shifting speed of the optical exposure system 30 and the corona charger unit 18, where M is the number of the X-electrodes 12.

The optical image exposure operation and the corona charging operation are conducted at a same time. The scanning of the X-electrodes 12 is conducted at the same time as the charging operation is conducted by the corona charger unit 18, or immediately after the charging operation is conducted by the corona charger unit 18. That is, the X-electrode scanning must be conducted before the charges on the photoconductive layer 16 reduce. The photoconductive layer 16 shows the conductivity corresponding to the light intensity applied to the surface of the photoconductive layer 16. The variation of the conductivity of the photoconductive layer 16 is detected by the corresponding X-electrodes 12. In this way, one line image information applied through the slit opening 26 of the charging unit 18 is read out by one cycle of the scanning of the X-electrodes 12. The signal level is great enough because the corona charging is conducted at the same time of the optical image exposure. Although the S/N ratio is reduced, an effective detection is conducted when, alternatively, the optical image exposure is conducted immediately after the corona charging operation. The shift operation of the optical exposure system 30 and the corona charger unit 18 in the X-direction is performed after completion of the reading operation of the one line information in order to conduct the reading operation of the next line image data.

[EXAMPLE I]

The two-dimensional image sensor was formed which has the size of 320 mm × 230 mm for reading the original of A4 size. The pitch of the X-electrodes 12 was selected at eight electrodes/mm. That is, 1840 X-electrodes were formed between the glass substrate 10 and the CdS photoconductive layer 16. The A4 size original was clearly read out within about one second (about 0.5 msec./line) with a sufficient S/N ratio, when the frequency of the X-electrode scanning was 4 MHz, the optical system 30 and the corona charger unit 18 were shifted at a speed 300 mm/sec., and the high voltage of −6 KV was applied to the corona wire 20 of 60 $\mu\phi$.

If a one-dimensional image sensor is formed through the use of the same photoconductive material as that described above, the A4 size document reading takes about 30 seconds (about 10 msec./line) when the same S/N ratio and the resolution are required.

The photoconductive layer is not limited to the CdS layer. Amorphous silicon and organic semiconductor can be used for the photoconductive layer. When an amorphous selenium photoconductive layer is employed, the corona charger should receive a high voltage of +7 KV. Furthermore, the original document 36 and the photoconductive layer 12 with the glass substrate 10 can be shifted while the optical exposure system 30 and the corona charger unit 18 are held stationary in order to scan the original document 36 in the X-direction.

Figure 3:
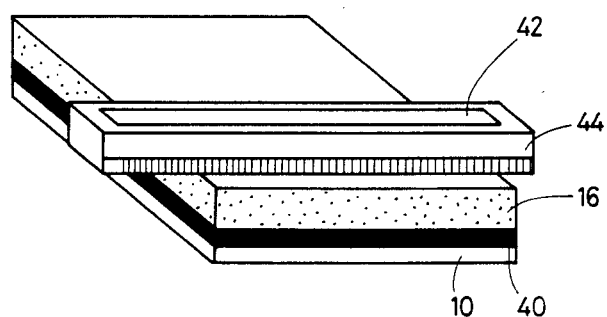
FIG. 3 is a perspective view of another embodiment of a two-dimensional image sensor of the present invention.

FIG. 3 shows another embodiment of the two-dimensional image sensor of the present invention. Like elements corresponding to those of FIG. 1 are indicated by like numerals.

A flat common electrode 40 is formed on the glass substrate 10 by depositing aluminum through the use of the evaporation technique. If the flat common electrode 40 is made of an aluminum plate or a stainless steel plate having sufficient strength, the glass substrate 10 can be omitted. The CdS photoconductive layer 16 should have the volume resistance greater than $10^8 \Omega$ cm, and the thickness of about 20 $\mu$m to 50 $\mu$m. In case the photoconductive layer 16 is made of amorphous silicon or amorphous selenium, the thickness of the photoconductive layer 16 is selected about 0.2 $\mu$m through 10 $\mu$m.

An optical fiber lens array 42 is provided along the Y-axis. The optical fiber lens array 42 is connected to a drive system so that the optical fiber lens array 42 is driven to travel in the X-direction. A pin electrode array 44 is provided along the optical fiber lens array 42 at the downstream of the shift movement of the optical fiber lens array 42 so that the surface of the photoconductive layer 16 is first exposed to the optical image exposure effected by the optical fiber lens array 42 and, then, the photoconductive layer 16 is charged by the pin electrode array 44. That is, the pin electrode array 44 is also driven to travel in the X-direction in unison with the optical fiber lens array 42. The pin electrode array 44 preferably includes 1840 pin electrodes aligned in the Y-direction (eight (8) pin electrodes/mm, and having a total width of 230 mm (A4 size)).

Figure 4:
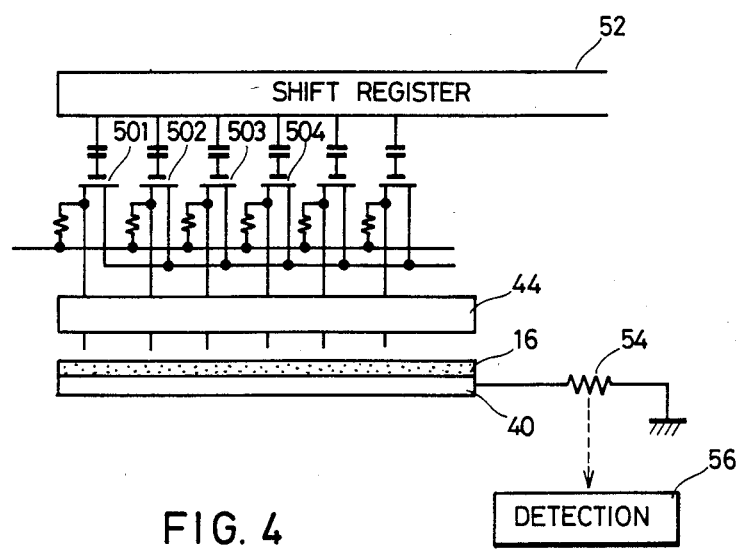
FIG. 4 is a circuit diagram of a driver circuit associated with the two-dimensional image sensor of FIG. 3.

FIG. 4 shows a driver circuit connected to the pin electrode array 44. The driver circuit includes switching field effect transistors (FETs) 501, 502, 503, 504, . . . The gate electrode of each of the FETs is connected to a shift register 52 in order to receive a scanning signal. Each of the FETs 501, 502, 503, 504, . . . is connected to the corresponding pin electrode included in the pin electrode array 44 in order to apply a voltage of about - 300 V, thereby charging the surface of the photoconductive layer 16.

The flat common electrode 40 is grounded via a resistor 54. A detection circuit 56 is associated with the resistor 54 in order to detect the current flowing through the resistor 54. By detecting the current flowing through the resistor 54 in synchronization with the switching operation of the switching FETs 501, 502, 503, 504, . . . , the optical image applied to the surface of the photoconductive layer 16 can be read out. More specifically, high voltage is applied from the pin electrode array 44 to the surface of the photoconductive layer 16 at a same time of or immediately after the application of the optical image by the optical fiber lens array 42. A large current is detected by the detection circuit 56 at a light portion because the resistance value of the photoconductive layer 16 is reduced by the light applied to the surface of the photoconductive layer 16. Little current is detected by the detection circuit 56 at a timing when the pin electrode corresponding to the dark portion is scanned.

[EXAMPLE II]

The two-dimensional image sensor was formed which has the size of 320 mm × 230 mm for reading the original of A4 size. The pitch of the pin electrodes was eight electrodes/mm. The A4 size original was clearly read out within about four seconds with a sufficient resolution by shifting the optical fiber lens array 42 and the pin electrode array 44 in the X-direction at a speed of 80 mm/sec.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A two-dimensional image reader comprising:
   a photoconductive layer of a predetermined thickness,
   said photoconductive layer having a first major surface and a second major surface opposed to said first major surface, each major surface having a preselected size extended in two-dimensions;
   charging means extended in one dimension over said first major surface of said photoconductive layer so as to apply charges on said first major surface of said photoconductive layer;
   optical exposure means disposed above said first major surface of said photoconductive layer, said optical exposure means being extended along said charging means;
   shift means for shifting said charging means and said optical exposure means in the other dimension with respect to said photoconductive layer; and
   detection electrode means secured to said second major surface of said photoconductive layer so as to develop a detection electric signal representative of an optical image applied by said optical exposure means.

2. The two-dimensional image reader of claim 1, wherein said optical exposure means includes an optical fiber lens array extended in said one dimension.

3. The two-dimensional image reader of claim 1, wherein said charging means includes a corona wire extended in said one dimension; and
   said detection electrode means includes a plurality of line electrodes each of which is extended in said the other dimension.

4. The two-dimensional image reader of claim 3, further comprising detection scanning means for scanning said plurality of line electrodes formed on said second major surface of said photoconductive layer.

5. The two-dimensional image reader of claim 1, wherein said charging means includes a pin electrode array extended in said one dimension; and
   said detection electrode means includes a flat common electrode attached to said second major surface of said photoconductive layer.

6. The two-dimensional image reader of claim 5, further comprising charge scanning means for scanning said pin electrode array, thereby sequentially applying a high voltage to said pin electrode arrray.

7. A two-dimensional image reader comprising:
   a glass substrate;
   a plurality of X-line electrodes formed on said glass substrate, each of said X-line electrodes having a predetermined length in the X-direction and being separated from each other with a preselected distance therebetween;
   a photoconductive layer formed on said glass substrate, said photoconductive layer having a two-dimensional size and covering said X-line electrodes formed on said glass substrate;

optical exposure means for applying an optical image onto said photoconductive layer;

corona charger means disposed above said photoconductive layer for charging the surface of said photoconductive layer, said corona charger means including a corona wire extending in the Y-direction;

shift means for shifting said corona charger means above said photoconductive layer in said X-direction which is substantially perpendicular to said Y-direction; and scanning circuit means for scanning said plurality of X-line electrodes, thereby obtaining an electric signal representative of the optical image applied by said optical exposure means.

8. The two-dimensional image reader of claim 7, wherein said optical exposure means includes an optical fiber lens array extended in said Y-direction.

9. The two-dimensional image reader of claim 8, said corona charger means including:

a housing securing said corona wire, said housing being provided with a slit opning extending in said Y-direction, wherein said optical fiber lens array is associated with said slit opening so that the optical image is applied onto said photoconductive layer through said slit opening.

10. The two-dimensional image reader of claim 9, wherein said photoconductive layer has a volume resistance greater than $10^8 \Omega$ cm.

11. A two-dimensional image reader comprising:

a flat common electrode;

a two-dimensional photoconductive layer formed on said flat common electrode;

optical exposure means for applying an optical image onto said two-dimensional photoconductive layer;

a pin electrode array disposed on said two-dimensional photoconductive layer, said pin electrode array having a plurality of pin electrodes aligned in a first dimension;

scanning means for scanning said pin electrode array, thereby sequentially applying a high voltage to each of said plurality of pin electrodes;

shift means for shifting said pin electrode array in a second dimension; and a detection circuit connected to said flat common electrode for detecting current flowing through said flat common electrode.

12. The two-dimensional image reader of claim 11, said optical exposure means including an optical fiber lens array extended in said first dimension.

13. The two-dimensional image reader of claim 12, wherein said optical fiber lens array is secured to said pin electrode array so that said optical fiber lens array is shifted in said second dimension in unison with said pin electrode array.

14. The two-dimensional image reader of claim 13, wherein said two-dimensional photoconductive layer has a volume resistance greater than $10^8 \Omega$ cm.

* * * * *